(12) United States Patent
Norberg et al.

(10) Patent No.: US 8,028,912 B2
(45) Date of Patent: Oct. 4, 2011

(54) DEVICE AND METHOD FOR CAPACITIVE READING OF A CODE

(75) Inventors: Petronella Norberg, Linköping (SE); Joakim Haglund, Linköping (SE); Staffan Nordlinder, Norrköping (SE)

(73) Assignee: ACREO AB, Kista (SE)

( * ) Notice: Subject to any disclaimer, the term of this patent is extended or adjusted under 35 U.S.C. 154(b) by 534 days.

(21) Appl. No.: 12/155,521

(22) Filed: Jun. 5, 2008

(65) Prior Publication Data

US 2009/0002171 A1    Jan. 1, 2009

Related U.S. Application Data (60) Provisional application No. 60/929,219, filed on Jun. 18, 2007.

(30) Foreign Application Priority Data

Jun. 18, 2007 (EP) ..................... 07110461

(51) Int. Cl.
G06K 7/08 (2006.01)

(52) U.S. Cl. ........ 235/451; 235/375; 235/435; 235/439; 235/487; 235/492

(58) Field of Classification Search .................. 235/435, 235/439, 451, 487, 492
See application file for complete search history.

(56) References Cited

U.S. PATENT DOCUMENTS

| 5,701,121 A | 12/1997 | Murdoch |
| 6,215,402 B1 | 4/2001 | Rao Kodukula et al. |
| 6,236,315 B1 | 5/2001 | Helms et al. |
| 6,351,216 B1 | 2/2002 | Frederick et al. |
| 6,611,224 B1 | 8/2003 | Nysen et al. |
| 2005/0139667 A1* | 6/2005 | Barrus et al. .................. 235/432 |

FOREIGN PATENT DOCUMENTS

| DE | 40 09 512 | 3/1990 |
| GB | 2 291 725 | 1/1996 |
| GB | 2 394 775 | 5/2004 |
| WO | WO 93/02430 | 2/1993 |

OTHER PUBLICATIONS

European Search Report dated Nov. 11, 2007.

* cited by examiner

*Primary Examiner* — Daniel Hess
*Assistant Examiner* — Ali Sharifzada
(74) *Attorney, Agent, or Firm* — Harness, Dickey & Pierce, P.L.C.

(57) ABSTRACT

In one embodiment of the present invention, a reading device and a method for determining an identity code is disclosed arranged at a package for a product. At least one embodiment of the present invention is based on capacitive measurements performed in capacitors formed between antennas of the reading device and communication areas of the identity code. The reading device is provided with an antenna or activation element for decoupling or minimizing perturbation signals generated in an electrically conductive foil of the package.

44 Claims, 4 Drawing Sheets

DEVICE AND METHOD FOR CAPACITIVE READING OF A CODE

CROSS-REFERENCE TO RELATED APPLICATIONS

This application claims benefit under 35 U.S.C. §119(e) to U.S. Patent Application No. 60/929,219, filed on Jun. 18, 2007 in the United States Patent Office, and claims benefit under 35 U.S.C. §119 to European Patent Application No. 07110461.6, filed on Jun. 18, 2007 in the European Patent Office, the disclosures of each of which are incorporated herein in their entirety by reference.

BACKGROUND

The present invention relates to a device and a method for reading a code arranged e.g. at a package for a product, in particular for minimizing a perturbation signal induced in an electrically conductive layer in the vicinity of the code.

Identity codes comprising a set of (or a series of) code elements or symbols are commonly placed on product packages to provide information about the products contained in these packages. These identity codes can be used in e.g. supermarkets for keeping track of the products or in industry for "track-and-trace" purposes in packaging production lines. The identity code can be made of e.g. a series of parallel lines, a geometrical arrangement of dots or of concentric circles, and be comprised between a start and a stop marker. Each of the code elements usually represents one bit of information of the identity code. Using e.g. a series of lines, the width of each of the lines and the spacing between the lines can be varied to represent different bits of information of the identity code, often called bar code. The identity code can then be read and decoded to retrieve the information about the product, such as e.g. its name. In bar code systems using optical reading methods, such as laser scanning or linear imaging, the identity code is scanned or imaged, respectively, to read the information. Thus, such methods require line-ofsight, which implies that the identity code has to be placed at an exterior surface of the product package to allow scanning or imaging. However, identity codes based on visual identification are not desirable since they can easily be reproduced and thereby facilitate counterfeiting of products. Further, identity codes are preferably not located at the exterior surface of the product package because of esthetical issues and risks for damages that would result in loss of information.

An alternative technique to optical bar code systems is a technique based on capacitance measurements using capacitance coupled radiofrequency identity systems, called capacitance coupled RFID systems in the following. In this technique, the code is composed of a series of or a set of code elements where each code element typically is comprised of two electrically conductive plates, either connected to each other or not connected to each other. The reader typically has a series of, or a geometrical arrangement of, pairs of antennas corresponding to the arrangement of the code elements of the code on the package where one of the antennas of said pairs capacitively induces a communication signal into the code element, and where the other antenna receives an input signal induced in response to the communication signal, if the two plates of the code element are connected. In this case, a bit of information corresponding to a value of "1" is received. If the two plates are not connected to each other, no signal is induced in the receiver antenna and a bit of information corresponding to a value of "0" is received. As capacitive connection is used, the code can be placed inside the packaging material of a product and therefore be both hidden and protected from e.g. scratches. However, capacitance coupled RFID systems are not used in applications where electrically conductive foils are comprised in the package of the product since the reliability of the technique is considerably reduced, due to the addition of a disturbing signal to the input signals received by the reader because of the presence of the electrically conductive foils. This problem is usually solved by increasing the input signals induced in response to the communication signals, which can be achieved by employing larger antennas in the reader and larger code elements in the code.

SUMMARY

Thus, there is a need for providing new devices and systems that would overcome the above-mentioned problems.

An object of the present invention is to wholly or partly overcome the above disadvantages and drawbacks of the prior art. More specifically, it is an object of the present invention to provide an improved device and method for reading a code arranged at a package comprising electrically conductive layers.

The present invention is based on an insight that a capacitance coupled RFID device may comprise a second activation element to be capacitively coupled to the electrically conductive layer of a package, thereby attenuating a perturbation signal generated in the electrically conductive layer.

Hence, according to a first aspect of the present invention, a device for determining a code arranged at a package for a product, wherein the package comprises a first communication area which is a part of the code and which is arranged at or surrounded by a first layer having a different electrical conductivity compared to the communication area, and a second conductive layer arranged at an inner side of the package relative to the first layer, is provided. The device comprises a first activation element arranged to receive a first alternating signal from an electrical source, and to capacitively induce a communication signal into the first communication area in response to the first alternating signal. Further, the device comprises a sensing element arranged to capacitively receive an input signal from the first communication area in response to the communication signal, and a second activation element arranged for being capacitively coupled to the second conductive layer to lower a perturbation signal induced in the second conductive layer in response to the first alternating signal. In particular, the second activation element is arranged for being capacitively coupled to the second conductive layer to minimize the perturbation signal.

According to a second aspect of the present invention, a method for minimizing a perturbation signal induced in an electrically conductive layer comprised in a package for a product when determining a code comprising at least one communication area arranged at the package is provided. The communication area has a first electrical conductivity and is arranged on or surrounded by an area having a different electrical conductivity. The method comprises the steps of arranging a first activation element in the vicinity of and spatially separated from the package, and arranging a sensing element in the vicinity of the package. The sensing element is spatially separated from each of the package and the first activation element. The method comprises also the steps of generating a first alternating signal in the first activation element, capacitively inducing a communication signal into the communication area in response to the first alternating signal, capacitively receiving in the sensing element an input signal in response to the communication signal, and arranging a second activation element in the vicinity of the package. The second activation element is spatially separated from each of the package, the first activation element and the sensing element such that the perturbation signal induced in the electrically conductive layer of the package in response to the first alternating signal is minimized capacitively.

Further embodiments of the present invention are provided as defined by the appended dependent claims.

The inventive device and method are advantageous since a code arranged at a package comprising an electrical layer can be determined more easily. Furthermore, such an inventive device and methods enable to hide the code inside the package, which is advantageous since the outer surface of the package may be used to provide other information about the products than a code, the code is protected and not sensitive to e.g. scratches, and the copy of the products becomes more complicated as the code is not visible. However, it is also possible to use the device according to the present invention for codes which are not arranged inside the package but at the outer surface of the package.

Generally, the input signal received by the sensing element of the reading device may have other origins than the signal induced by the communication area of the code. The input signal may for instance include cross-talk signals, which may be signals induced because of the proximity of the sensing element to other elements of the reading device, or because of the proximity of the device to perturbing electrically conductive layers of the package at which the code is arranged. Cross-talk signals generally have a frequency near or equivalent to the frequency of the first alternating signal, since they are initially induced by the first alternating signal. However, the phase of these crosstalk signals may be shifted as compared with the phase of the first alternating signal. Further, the input signal may include noise signals generated by other components of the system. These noise signals may not necessarily have the same frequency as the first alternating signal generated in the first activation element.

In an embodiment, the second activation element of the inventive device may be connected to a grounding potential point in order to attenuate the perturbation signal induced in the second conductive layer. This is an advantageous solution since it requires very little procedures and components. During measurement sessions, i.e. when the second activation element is arranged in proximity with the second conductive layer, the perturbation signal in the second conductive layer is capacitively attenuated due to the grounding potential at the second activation element. The capacitive attenuation is achieved by a capacitor which is formed with the second activation element and the second conductive layer, the insulating material usually being air and possibly materials of the package. The capacitor should preferably have a high capacitance, i.e. plates with a large area and an insulating layer with a small thickness.

In another embodiment, the second activation element may be arranged to receive a second alternating signal from a signal source and to capacitively induce a perturbation-reducing signal into the second conductive layer in response to the second alternating signal. The second alternating signal has approximately the same frequency as the first alternating signal, but the phases of the first and second signals are out of phase with each other. Thus, the perturbation signal is attenuated by destructive interference. However, the phase-shift between the second and the first alternating signals might not be 180° exactly. In particular, the phase of the second alternating signal may be determined during a calibration procedure in which the contribution of the electrically conductive foil in the input signal received by the sensing elements is minimized. The resulting phase-shift of the second alternating signal as compared to the first alternating signal might differ from 180° because of the contribution of phase-shifting components of the system comprised of the device and the package of the product. These phase-shifting components may be materials comprised in the package.

According to one embodiment, the second alternating signal is phase shifted by a phase-shift comprised between 170 and 190 degrees as compared to the phase of the first alternating signal, preferably between 175 and 185 degrees, and more preferably between 178 and 182 degrees. In another embodiment, the reading device may comprise a plurality of first activation elements and sensing elements, wherein the elements are arranged in sets and each set comprises a first activation element and a sensing element. In a particular embodiment, a set is a pair of first activation element and sensing element. However, in another embodiment, the set comprises a plurality of elements, with e.g. one activation element and more than one sensing element, which is advantageous since it provides a device enabled to read a tag having a plurality of communication areas, each communication area comprising several bits of information. Alternatively, the set may comprise one sensing element and more than one activation element. In particular, the distance between the sets and the communication areas may be equal, such that the sets and the communication areas can communicate capacitively with each other.

Although the perturbation signal can be significantly attenuated or lowered by either grounding the second activation element or generating a counter phase signal in the second activation element, the perturbation signal might not be completely eliminated. In a particular embodiment, the signal induced in the sensing element in response to the attenuated or lowered perturbation signal of the second conductive layer is subtracted from the input signal received by the sensing element during measurement sessions. Thus, the influence of the second conductive layer or electrically conductive foil of the package is further reduced.

In one embodiment, the area of the second activation element is at least two times larger than either one of the first activation element and the sensing element, preferably at least five times larger, and more preferably at least ten times larger. This is advantageous since the attenuation of the perturbation signal via the second activation element is proportional to its area.

Normally but not necessarily, the area of the communication area of the code is at least five times smaller than the area of the electrically conductive foil or second conductive layer, preferably at least ten times smaller.

In yet a further embodiment, the inventive device may comprise an amplifier connected between a processor and the sensing element in order to amplify the input signal received by the sensing element.

In another embodiment, the device comprises a frequency filter connected to the sensing element in order to select a frequency range of the input signal and to provide this frequency range to the processor or the amplifier. In particular, the frequency range preferably corresponds to the frequency of the first alternating signal, which is advantageous since other components of the input signal than the signal induced by the communication area, such as noise signals of other frequencies, e.g. induced by other materials of the package, may be eliminated.

In another embodiment, the first activation element and the sensing element are separated from each other by a material connected to ground, which is advantageous since it enables to attenuate crosstalk contributions to the input signals received by the sensing elements.

In essence, the invention relates to the use of a grounding potential for decoupling a perturbation signal induced in a conductive layer of a package for a product when determining a code arranged at the package, wherein the perturbation signal is induced in the conductive layer in response to a first alternating signal generated in a first activation element, or the use of a capacitively induced signal for reducing a perturbation signal induced in a conductive layer of a package for a product when determining a code arranged at the package, wherein the capacitively induced signal has approximately the same frequency as a first alternating signal generated in a first activation element and wherein the phases of the first alternating signal and the capacitively induced signal are out of phase with each other.

BRIEF DESCRIPTION OF THE DRAWINGS

Further objectives of, features of, and advantages with the present invention will become apparent when studying the following detailed disclosure, the drawings and the appended claims. Those skilled in the art realize that different features of the present invention can be combined to create embodiments other than those described herein.

The above, as well as additional objects, features and advantages of the present invention, will be better understood through the following illustrative and non-limiting detailed description of preferred embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EXAMPLE EMBODIMENTS

Figure 1A:
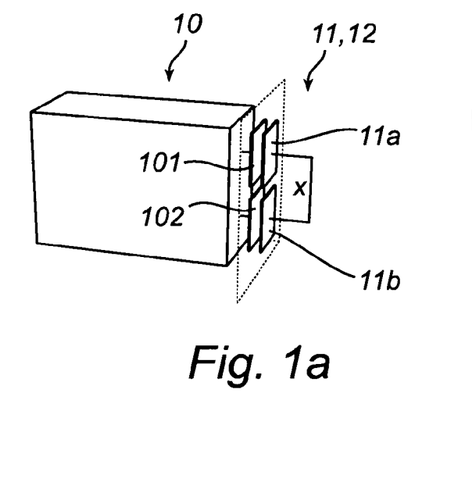
FIGS. 1a and 1b show the principle of a capacitance coupled RFID system.
Figure 1B:
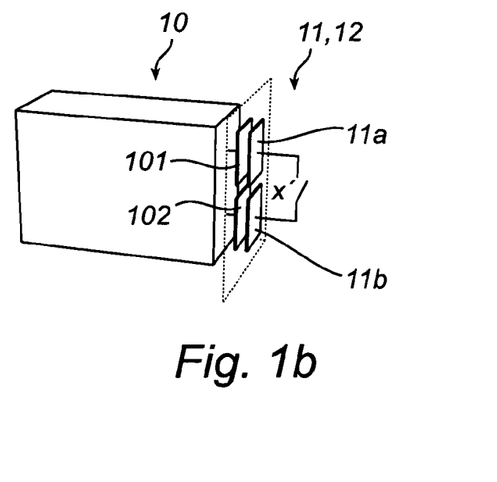

With reference to FIGS. 1a and 1b, the basic principle of a capacitance coupled RFID system will be described below. The system comprises a reader 10 and an identity code 11 separated by an imaginary plane indicated by a dashed line.

In general, the identity code, also called tag in the following, is composed of a series of, or a geometrical arrangement of, communication areas 12 (or units of information or code elements). Some examples of different tags will be given with reference to FIGS. 3a-3c later. As the code or tag 11 represented in FIGS. 1a and 1b comprises only one communication area 12, the terms tag and communication area are interchangeable in the example described with reference to FIGS. 1a and 1b. We have chosen to refer to the tag 11. This tag 11 is represented as two electrically conductive plates 11a and 11b either connected to each other as shown in FIG. 1a or not connected to each other as shown in FIG. 1b. In other words, the conductive plates can be arranged in one of two states. In a first state the conductive plates are electrically connected to each other by an electrically conductive material X as shown in FIG. 1a, and in a second state there is an electrical interruption X' between the two conductive plates as shown in FIG. 1b. The reader 10 typically has a series of pairs of antennas (or sets of antennas) corresponding to the series of, or the geometrical arrangement of, the communication areas of the identity code. As the tag 11 comprises only one communication area in this embodiment, only one pair or set of corresponding antennas is shown to the left of the imaginary plane in FIGS. 1a and 1b, which pair comprises a sender antenna 101, also called first activation element, and a receiver antenna 102, also called sensing element. The two antennas of the reader are preferably separated by the same distance as the distance between the two conductive plates of the tag 11. During measurement sessions, a first alternating signal is generated in the sender antenna 101, which can then capacitively induce a communication signal into the first plate 11a of the tag 11. If the two plates 11a and 11b of the tag 11 are electrically connected to each other, the communication signal is then transmitted from the first plate 11a to the second plate 11b of the tag 10 via the conductive material X. Finally, the receiver antenna 102 of the reader 10 receives an input signal induced in response to the communication signal.

The received signal results in the determination of a bit of information represented by a value of "1". If the two plates 11a and 11b are not connected to each other, no signal or a signal of substantially lower amplitude is induced in the receiver antenna 102, thus resulting in the determination of a bit of information represented by a value of "0".

When the reader 10 is in proximity with the tag 11 of the identity code, e.g. during measurement sessions, a first capacitor is formed by the sender antenna 101 of the reader 10 and the first electrically conductive plate 11a of the tag 11, and a second capacitor is formed by the receiver antenna 102 of the reader 10 and the second electrically conductive plate 11b of the tag 11. In this example, the insulating layer between these two capacitors is air, but other media is also contemplated. In other words, the tag can be seen as a single communication area characterized by its electrical conductivity, which conductivity could be high, then representing the case where the two plates 11a and 11b are electrically connected to each other, or low (or null), then representing the case where the two plates 11a and 11b are not connected to each other. If the communication area is made of a continuous material of high electrical conductivity, the electric circuit is closed and the reader 10 can detect a signal resulting in a bit of information represented by a value of "1". If, on the other hand, the electric circuit is opened because the communication area is made of material having a lower electrical conductivity, the reader 10 would not detect any signal or a signal of lower amplitude, thus resulting in a bit of information represented by a value of "0". The input signals induced into the receiver antenna in response to the communication signal are normally compared to a threshold value to determine if the communication area corresponds to a bit of information having a value of "0" or "1".

Figure 2:
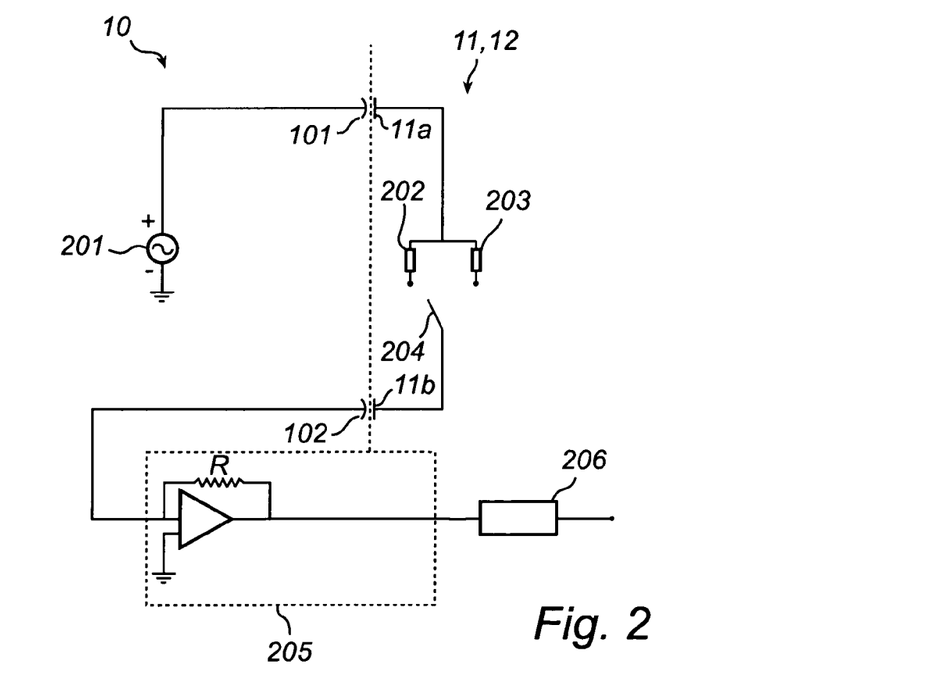
FIG. 2 shows the electronic circuitry of a capacitance coupled RFID system.

FIG. 2 shows an example of the electrical circuit of a capacitance coupled RFID system. In this example, an electrical source 201 generates an alternating sinusoidal signal centred at 0 V with an amplitude of 10 V and a frequency of 125 kHz. This alternating sinusoidal signal is then provided to a sender antenna or first activation element 101. During measurement sessions, in which the sender antenna 101 is arranged in proximity of a plate 11a of a tag 11 arranged at a package, an alternating signal is induced in the plate 11a of the tag 11. The tag 11 described with reference to FIGS. 1a and 1b is equivalent to the tag 11 shown in FIG. 2, i.e. also represented by two plates 11a and 11b. As mentioned above, depending on whether the electrical conductivity of the tag 11 is high or low, which is represented by the two plates 11a and 11b being connected or not connected to each other, respectively, the signal induced in the plate 11a may or may not be electrically transferred to the plate 11b of the tag, respectively. In the case where the signal is transmitted, an alternating input signal is induced in the 5 receiver plate or sensing element 102 of the reader 10. This input signal may then be amplified by an amplifier 205, such as the amplifier 205 shown in FIG. 2 having a gain of 100 dB, and then compared in a processor 206 with a threshold value to determine the information corresponding to the electrical conductivity of the tag. The processor 206 may therefore comprise a comparator (not represented in the Figures). The particular parameters (amplitude, frequency, etc) are only given as an example and may of course vary from one measurement session to another as these parameters may be selected by a user. A person skilled in the art would easily select other values appropriate to a specific code or application.

In FIG. 2, the electrical conductivity of the communication area 12, or the electrical conductivity of the tag 11, since there is only one communication area 12 in this embodiment, may be indicated by the resistance of the communication area 12, which, for instance, may be a value of 10.0 MOhm when the switch 204 is connected to a first resistance 202, or a value of 10 Ohm when the switch 204 is connected to a second resistance 203. If the switch is connected to the first resistance (10 MOhm), the circuit can be considered as opened and a very weak signal would be induced in the sensing element 102, thus the resistance of the tag would correspond to a signal value lower than the threshold value, i.e. an information of "0". If the switch is connected to the second resistance (10 Ohm), the circuit can be considered as closed and a signal would be induced in the sensing element with a signal value above the threshold value, thus resulting in an information of "1".

Figure 3A:
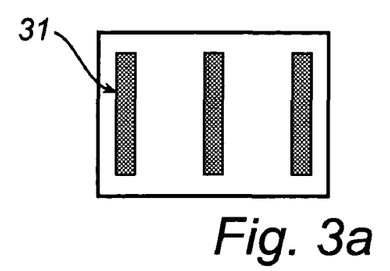
FIGS. 3a-3c show examples of identity codes or tags comprising a series of or a set of communication areas.
Figure 3B:
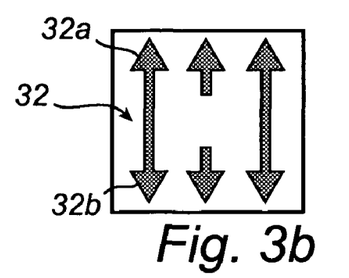
Figure 3C:
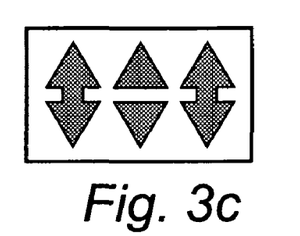

FIGS. 3a-3c schematically illustrate three front views which show examples of identity codes or tags comprising a series of alternatively electrically conductive and non-electrically conductive communication areas. As mentioned above, each of the communication areas or units of information of the tag may be formed by one continuous area 31 characterized by its electrical conductivity, as illustrated in FIG. 3a. However, the communication area 32 may also be formed by two plates or two portions 32a and 32b, as illustrated in FIGS. 3b and 3c. If the information comprised in the communication area is equivalent to "1", the two portions are connected to each other. If the information comprised in the communication area is equivalent to "0", the two portions are preferably not connected to each other, as illustrated by the second communication area shown in FIGS. 3b and 3c. Alternatively, an information corresponding to "0" may also be obtained by leaving the communication area empty, as illustrated by the second communication area or unit of information shown in FIG. 3a, taken from the left. The tag shown in FIG. 3a comprises five communication areas or five bits (or five units) of information, resulting in the information "10101" while the tags shown in FIGS. 3b and 3c each comprises three communication areas with the resulting information "101". During measurement sessions, a communication area such as one of the communication areas shown in FIGS. 3a-3c is aligned with a pair of sender and receiver antennas. The communication area will either couple the alternating signal from the sender antenna to the receiver antenna or not, thus resulting in an information of "1" or "0", respectively, depending on the conductivity of the communication area.

In the examples shown in FIGS. 3b and 3c, a communication area 32 representing an information of "1" comprises two triangular plates 32a and 32b spaced from each other. These two plates 32a and 32b are electrically connected to each other by a conductive line, which is narrower than the width of the base of the plates 32a and 32b. As illustrated in FIGS. 3b and 3c, the length of the conductive line connecting the two plates 32a and 32b may be varied. This length may be smaller or greater than the width of the plates, and would normally correspond to the distance between the sender antenna and the receiver antenna of the reader. In the example shown in FIG. 3a, a communication area representing an information of "1" comprises a continuous rectangular plate of conductive material 31. The distance between the communication areas will affect the contribution of crosstalk signals in the input signals received by the sensing element. Although a large distance between the communication areas is preferable to reduce crosstalk, a larger distance between the plates reduces the number of communication areas which may be arranged in the available space, and hence reduces the largest number of information bits which can be arranged within the space.

The shape of the portions 32a and 32b may be designed such that they match the shape of the sender antenna 101 and the receiver antenna 102. However, the device would still function even if the shape of the sender and receiver antennas do not perfectly match the shape of the portions of the communication areas.

The portions 32a and 32b of the communication area 32 may have many different shapes, such as circular, triangular, square, rectangular or star-like.

Figure 4A:
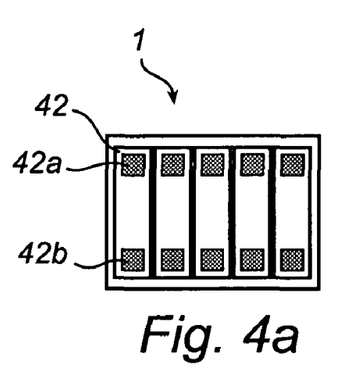
FIGS. 4a-4c show examples of sets of sender and receiver antennas (first activation element and sensing element), which sets are particularly adapted to read the codes or tags shown in FIGS. 3a-3c, respectively.
Figure 4B:
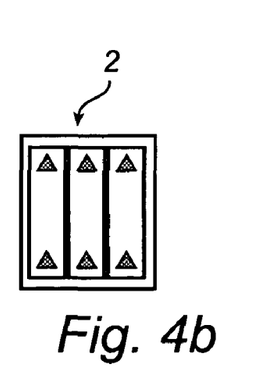
Figure 4C:
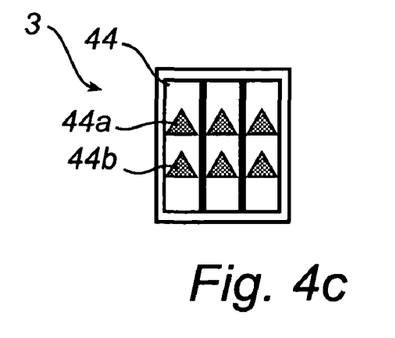

FIGS. 4a-4c schematically illustrate three front views which show three examples of readers, or sets of antennas, designed to match the tags shown in FIGS. 3a-3c, respectively. In the example shown in FIG. 4a, a first set 1 is made of five pairs of antennas 42, wherein each pair comprises a first plate working as sender antenna 42a and a second plate working as a receiver antenna 42b. The sender and the receiver antennas 42a and 42b are isolated from each other and hence preferably not directly connected to each other by any electrically conductive material. It is only during measurement sessions that these two antennas may be capacitively connected to each other, e.g. in the case where the communication areas arranged in front of a set of antennas have a high electrical conductivity. This first set 1 of antennas is particularly suitable to read the tag shown in FIG. 3a. Two other antenna sets 2 and 3 are shown in FIGS. 4b and 4c, respectively, and are particularly suitable for reading the codes or tags shown in FIGS. 3b and 3c, respectively. The distance between the first activation element 44a and the sensing element 44b should preferably correspond to the distance between the plates of the communication area. However, this length is preferably adjusted with respect to the reader since it is preferable to minimize direct interaction between the first activation element 44a and the sensing element 44b.

The size of the first activation element 44a and the sensing element 44b of the devices 2 and 3 may have the same shape and area as the first and second portions of each communication area of the tags shown in FIGS. 3b and 3c. However, the size of these elements may also be less than the size of the portions of the tags, which alleviates the constraints on alignment between the portions of the tags and the elements of the device. The alignment procedure will be explained later.

A communication area may e.g. be made of a material selected from the group comprising polyaniline, polypyrrol, polyacetylene, polythiophene, printed carbon and printed metallic ink such as silver and Copper, and metals such as aluminium. The geometrical arrangement of the communication areas may also be printed on the package with PEDOT: PSS ink. A cost effective way to manufacture the tags is by use of a printing technique, e.g. by reel to reel, off-set printing or screen printing.

The number of bits contained in the code may be increased either by increasing the number of communication areas or by increasing the number of portions in each of the communication areas, thereby increasing the number of sender and receiver antenna pairs in the device or increasing the number of sensing elements in each of the pairs, which will be illustrated in more detail with reference to FIGS. 7 and 8 later.

Figure 5:
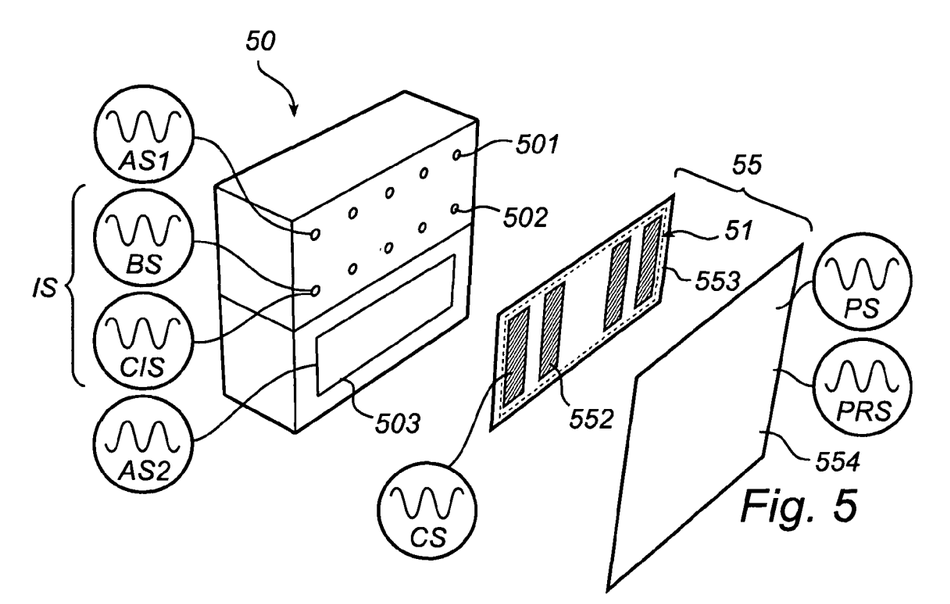
FIG. 5 shows a perspective view of a capacitance coupled RFID device according to an embodiment of the present invention.

With reference to FIG. 5, an embodiment of the device according to the present invention will be described.

FIG. 5 schematically shows a perspective view of a device 50, also called a reader 50, with five sets or pairs comprising a sender antenna 501, also called first activation element 501, and a receiver antenna 502, also called sensing element 502. Each of the sets of sender and receiver antennas are equivalent to the respective pair of sender and receiver antennas described with reference to FIGS. 1 and 2.

During measurements sessions, a first alternating signal AS1 is generated in the first activation element 501, which induces a communication signal CS in a corresponding communication area 552 of a tag 51 arranged at a package 55 for a product. Assuming that the communication area 552 is made of conductive material or two portions of conductive materials connected to each other, as described above with reference to FIGS. 1-3, the communication signal CS will then induce an input signal IS in the corresponding sensing element 502. The processing of this input signal IS would then enable to retrieve the information contained in the communication area 552. However, the input signal IS received by the sensing element 502 might include other signals than the signal intentionally induced in response to the communication signal of the communication area 552. For convenience purposes, the part of the input signal corresponding to the signal induced in response to the communication signal is called communication input signal CIS and the part of the input signal corresponding to other signals will be called B signal BS, as shown in FIG. 5.

The input signal IS may for instance include cross-talk signals, which may be signals induced because of the proximity of the sensing element 502 to other elements of the device 50, or because of the proximity of the device 50 to perturbing electrically conductive layers of the package 55 at which the tag 51 is arranged. Cross-talk signals generally have a frequency equivalent or near the frequency of the first alternating signal AS1 since they are initially induced by the first alternating signal AS1. However, the phase of these cross-talk signals may be shifted as compared with the phase of the first alternating signal AS1. Further, the input signal IS may include noise signals generated by other components of the system. These noise signals might not necessarily have the same frequency as the first alternating signal AS1 generated in the first activation element or sender antenna 501.

The device 50 is therefore adapted to read the code or tag 51 arranged on the package 55 for a product, which package comprises a first layer 553 at which the communication areas 552 of the tag 51 are arranged, and an electrically conductive layer or second conductive layer 554 arranged at an inner side of the package 55 relative to the first layer 553. For this purpose, the device 50 comprises also a second activation element 503 arranged for being capacitively coupled to the electrically conductive layer 554 of the package 55. This results in that any perturbation signal PS induced in the electrically conductive layer or foil 554 in response to the first alternating signal AS1 generated in the sender antenna 501 may be lowered or minimized.

Note that FIG. 5 shows an exploded view of the package 55, which enables to well distinguish the first layer 553 on which the tag 51 is arranged and the second conductive layer or foil 554. However, these layers are often joined together to form the package or material assembly. In a particular embodiment, the first and second layers may be attached to each other, as e.g. in a laminate. In another particular embodiment, the package may be a paper-based material assembly comprising a conductive layer. Further, there may be several other layers arranged between the second conductive layer 554 and the first layer 553.

Typical examples of packages including a conductive layer 554 in which a perturbation signal PS is normally induced when performing capacitance coupled RFID measurements are cigarette packets and packages for food comprising a laminate including a metallic layer. In such packages, a perturbation signal PS would be capacitively induced in the metallic foil comprised at the inside of the package when reading a code arranged at the package.

The communication areas 552 may have a different electrical conductivity than the conductivity of the first layer 553, in particular when the communication area 552 represents an information of "1". However, as mentioned above with reference to FIGS. 3a-3c, if the information contained in the communication area is "0", the material of the communication area 552 may be equivalent to the material of the first layer 553.

Figure 6:
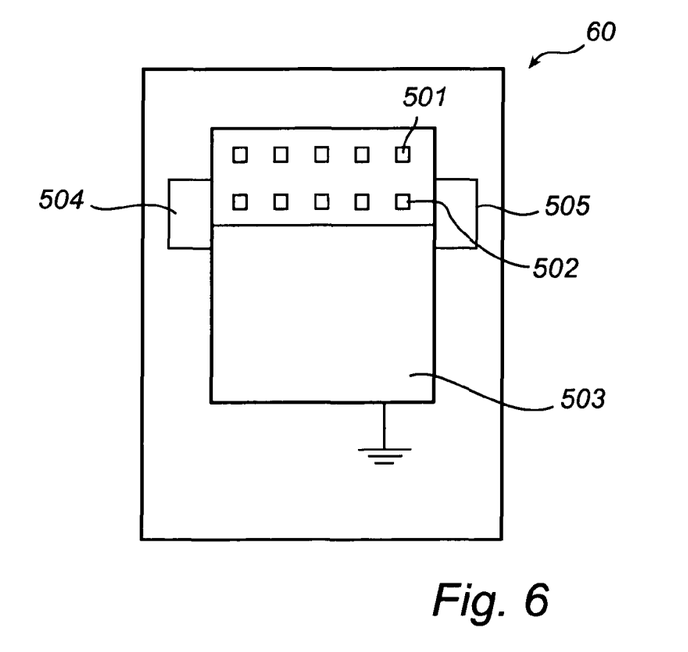
FIG. 6 shows a front view of a capacitance coupled RFID device according to another embodiment of the present invention.

In a first alternative, the perturbation signal PS may be lowered or minimized by connecting the second activation element 503 to a grounding potential, which is schematically represented in FIG. 6. During measurement sessions, i.e. when the second activation element 503 is arranged in proximity of the package, the perturbation signal PS is then capacitively attenuated. A capacitor is formed with the second activation element 503 and the second conductive layer 554, the insulating material being air and possibly materials of the package 55 and/or the reader. It is preferable to achieve a capacitor with a high capacitance, which is obtained if the area of the plates forming the capacitor, in particular the area of the second activation element 503, is large, and if the thickness of the capacitor, i.e. the distance at which the second activation element 503 is placed from the second conductive layer 554, is small.

In another alternative, the perturbation signal PS may be minimized by generating a second alternating signal AS2 in the second activation element 503 in order to capacitively induce a perturbation-reducing signal PRS into the second conductive layer 554, as shown in FIG. 5. In particular, the second alternating signal AS2 and the first alternating signal AS1 have the same frequency but are out of phase with each other, which results in that the perturbation signal PS induced in the electrically conductive layer 554 in response to the first alternating signal AS1 is attenuated by destructive interference.

However, the phase-shift between the second and the first alternating signals might not be 180° exactly. In particular, the phase of the second alternating signal may be determined during a calibration procedure in which the device 50 is arranged in proximity with an electrically conductive layer without any communication area. A first alternating signal AS1 is then generated in the first activation element 501, which capacitively induces a perturbation signal PS in the electrically conductive foil 554. The perturbation signal PS of the electrically conductive foil 504 then capacitively induces a signal, called BS or B signal herein, in the sensing element 502. As this B signal is undesired during measurement sessions, a second alternating signal AS2 is generated in the second activation element 503 with a phase and amplitude optimized to attenuate the B signal. The generation of the second alternating signal AS2 in the second activation element 503 capacitively induces a perturbation-reducing signal PRS in the electrically conductive foil 504, which perturbation-reducing signal PRS attenuates the perturbation signal PS by destructive interference. The optimized phase of the second alternating signal AS2 is dependent on the different components of the system, e.g. the materials comprised in the package. In other words, the phase of the second alternating signal AS2 depends on whether there are phase-shifting components in the system or not. Thus, the phase of the second alternating signal AS2 might not be phase-shifted by exactly 180° as compared to the phase of the first alternating signal AS1. As a result of this calibration procedure, the perturbation signal is lowered or minimized, thereby lowering or minimizing the B signal received by the sensing elements.

In a particular embodiment, the second alternating signal AS2 is phase-shifted by a phase-shift comprised between 170 and 190 degrees as compared to the phase of the first alternating signal AS1, preferably between 175 and 185 degrees, and more preferably between 178 and 182 degrees. The reading device 50 may also comprise a processor (not shown in FIG. 5) equivalent to the processor 206 described with reference to FIG. 2. In addition, the processor of the device 50 may be adapted to subtract each of the lowered B signals induced in each of the sensing elements 502 in response to the lowered perturbation signal of the second conductive layer 554, from each of the input signals IS of the sensing elements received during measurement sessions. The lowered perturbation signal is the result of the attenuation of the perturbation signal by either the grounding of the second activation element 503 or the destructive interference of the perturbation signal with the perturbation-reducing signal induced in the second conductive layer in response to the second alternating signal AS2. The subtraction of the lower perturbation signal enables to further attenuate the influence of the electrically conductive foil or second conductive layer 554 during the measurements of the communication input signals CIS, and thereby the influence on the information contained in the communication areas.

Any one of the tags described with reference to FIGS. 3a-3c may be used in combination with the device 50 described with reference to FIG. 5.

The distance between the reader 50 and the code 51 arranged at the package 55 is preferentially in the order of the size of the capacitor surfaces or smaller to ensure satisfactory transmission of the signal.

The robustness towards poor lateral alignment between the device and the tag is generally less than the distance between two neighbouring sender/receiver plate pairs. Specifically designed communication areas, and therefore specifically designed receiver and sender antennas, may be used for alignment purposes, which will be described with reference to FIG. 6 in the following.

FIG. 6 shows a front view of a device 60 according to another embodiment of the present invention. The device 60 is equivalent to the device 50 described with reference to FIG. 5 except that a sender alignment element 504 and a receiver alignment element 505 are provided for alignment of the device 60 with the code or tag to be determined. The sender 504 and receiver 505 alignment elements operate in the same manner as the first activation 501 and the sensing 502 elements, respectively. Corresponding first and second alignment areas are then arranged on the first layer of the package. A communication signal is capacitively induced in the first alignment area in response to an alternating signal generated in the sender alignment element 504 and another signal is generated in the sensing alignment element 505 when this sensing alignment element 505 is aligned with the corresponding second alignment area arranged at the first layer of the package. The alignment areas are not shown in FIG. 6 but these areas would be equivalent to areas as described with reference to FIGS. 3a-3c. In particular, a trapezoidal shape may be used, which provides a larger variation in signal between a non-aligned position and an aligned position of the device with respect to the tag. The alignment areas may be a part of the tag.

This alignment procedure suggests that a standard or several standards could be used. In this case, a particular type of device comprising sender and receiver alignment elements of a particular shape and spaced at a particular distance from each other would be adapted to a particular standard of tag. The use of a standard would be advantageous since a single reading device would be suitable for reading any tags.

In a particular embodiment, the device may comprise a plurality of sets of first activation element and sensing element. The sets may then be arranged to capacitively communicate with a plurality of communication areas spaced from each other, the distance between the sets of sender/receiver antennas being equivalent to the distance between the communication areas.

In a particular embodiment, the sets may be arranged along a line. In yet another embodiment, the sets may be arranged in the form of a matrix.

Figure 7:
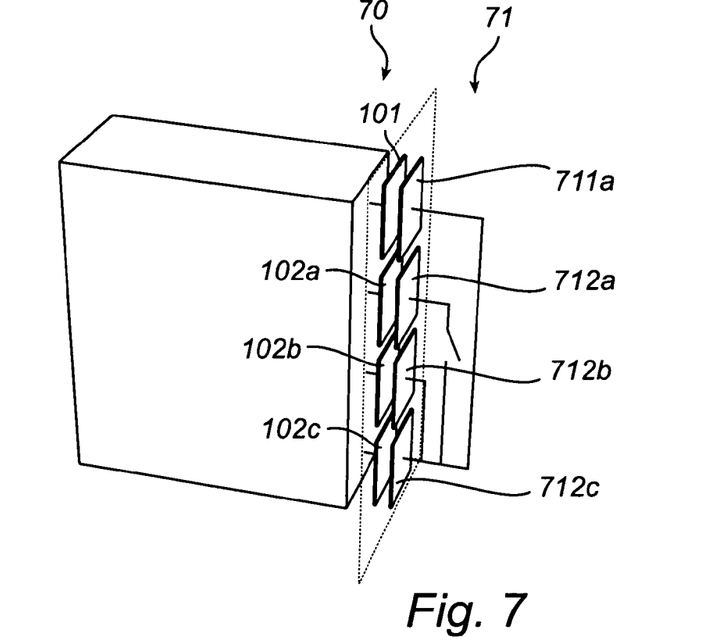
FIG. 7 shows a capacitance coupled RFID device comprising a set of one sender antenna and several receiver antennas.

FIG. 7 shows a capacitance coupled RFID device arranged as described in relation to FIGS. 1a and 1b except that it comprises a set of one sender antenna and several receiver antennas. This set of sender and receiver antennas is particularly adapted to determine the information contained in a communication area made of a plurality of portions. In particular, FIG. 7 shows an example of a device 70 comprising one sender antenna 101 and three receiver antennas 102a-102c. The device 70 is therefore well adapted to read the information of a communication area 71 comprising four portions, namely one portion 711a in which, during measurement sessions, a communication signal is induced in response to a communication signal generated in the sender antenna 101, and three portions 712a-712c either connected or not to the portion 711a. If one of these portions 712a-712c is connected to the portion 711a, for instance the portion 712c, the communication signal capacitively induced in the portion 711a is electrically transferred from the portion 711a to the portion 712c, and an input signal is induced in the sensing element 102c placed in the proximity with the portion 712c. The alignment of the elements of the device 70 with the portions of the communication area 71 may be performed during an alignment procedure such as the procedure described above with reference to FIG. 6. As the tag comprises only one communication area 71, we will refer to the tag rather than to the communication area in the following. This particular tag 71 comprises therefore three bits of information represented by the connections between portions 711a and 712a, 711a and 712b, and 711a and 712c, respectively, which bits of information can then be read or sensed by the sensing elements 712a, 712b and 712c, respectively. The particular tag 71 shown in FIG. 7 contains the following information: "011".

Each of the sensing elements may be connected to an amplifier and a processor such as the amplifier 205 and the processor 206 described above with reference to FIG. 2. As an alternative, the sensing elements may be connected to a common processor and a common amplifier.

Figure 8:
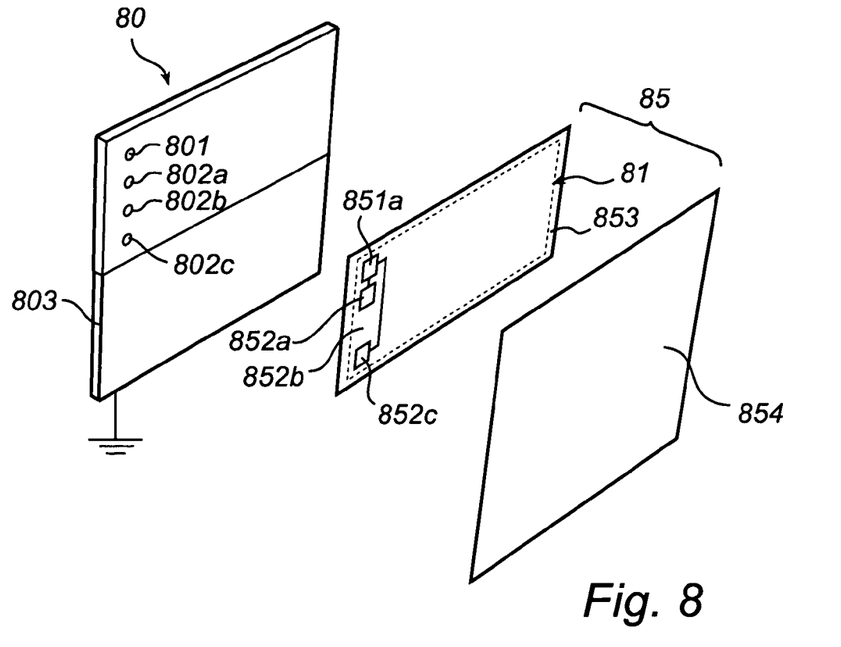
FIG. 8 shows a perspective view of a capacitance coupled RFID device according to another embodiment of the present invention.

With reference to FIG. 8, another embodiment of the capacitance coupled RFID device of the present invention is described. The device 80 is equivalent to the device 70 described with reference to FIG. 7 except that the device 80 is adapted to determine the information contained in a tag or code arranged on a package 85 for a product, which package comprises a first layer 853 on which at least one communication area 852 of the tag 81 is arranged, and an electrically conductive layer or second conductive layer 854 arranged at an inner side of the package 85 relative to the first layer 853.

For this purpose, the device 80 comprises also a second activation element 803 such as the second activation element 503 described above with reference to FIG. 5. This second activation element 803 may then be capacitively coupled to the electrically conductive layer 854 of the package 85, and thereby attenuate any perturbation signal induced in the electrically conductive layer or foil 854 in response to alternating signals generated in the sender antennas 801 of the reader 80. Attenuation of the perturbation signal by means of a grounding potential at the second activation element 803 is represented in FIG. 8. However, the perturbation signal induced in the electrically conductive layer 854 may be attenuated by destructive interference with a perturbation-reducing signal induced in response to a second alternating signal generated in the second activation element 803, e.g. as described with reference to FIG. 5.

Generally, referring to the embodiments described above, it is preferable that the elements of the devices 10, 70 and 80 match the portions of the communication areas 11, 71 and 81, respectively, for an improved reading of the information contained in these communication areas. In other words, it is preferable that the shape of and the distance between the elements of these devices are approximately the same as the shape of and the distance between the portions of the communication areas to be read.

The elements of these devices, and the portions of these communication areas, respectively, may be arranged along a line or in a matrix configuration.

In a particular embodiment, the processor, the amplifier and the filter may be arranged at a circuit board connected to the elements of the device or reader. Further, an antenna board comprising the receiver antennas and the transmitter antennas may be connected to this circuit board via a pin block. The antenna board may then be easily replaced. The circuit board may also include electronics controlling the reading procedure of the information contained in the tags. For instance, when reading the signal from a chain of receiver antennas, i.e. when reading a code having several communication areas arranged along a line, the receivers may be sampled in sequence one by one.

In order to prevent crosstalk signals between the sender and receiver antennas, the plates constituting the antennas (also called first activation element and sensing elements above) may be surrounded by a guard ring or material connected to ground. For the same reason, a ground plane may be arranged on the backside of the antenna board described above.

In particular, the elements of the devices described above may be made of one of the group comprised of conductive polymers such as polyaniline, polypyrrol, polyacetylene, polythiophene, and metals such as aluminium or copper. As mentioned above, the shape of the elements may vary and would preferably be adapted to the shape of the portions of the communication areas. In a preferred embodiment, the elements have a rectangular shape.

It is also preferable, but not necessary, that the first activation element and sensing elements of the devices described above are arranged in parallel with each other and preferentially in a common plane.

The present invention is applicable in any applications in which identity codes are used, and in particular in applications in which the identity codes have to be placed at a material assembly comprising electrically conductive foils. Such applications are found in packaging materials of consumer products where metal foils are used to protect goods (e.g. cigarettes, pharmaceutical products and juice) and where metal foils are used in exclusive packages (e.g. perfume and chocolate). The metal foils may also be a part of the product containing the identity code such as in trading cards. The present invention is also applicable for keeping track of e.g. documents in document management tools, cars in rental car companies or luggage at airport.

Although the invention above has been described in connection with preferred embodiments of the invention, it will be evident for a person skilled in the art that several modifications are conceivable without departing from the scope of the invention as defined by the following claims.

The invention claimed is:

1. A device for determining a code arranged at a package for a product, the package including a communication area which is a part of the code and which is arranged at or surrounded by a first layer having a different electrical conductivity compared to the communication area, and a second conductive layer arranged at an inner side of the package relative to the first layer, said device comprising:
   a first activation element arranged to receive a first alternating signal from an electrical source, and to capacitively induce a communication signal into said communication area in response to said first alternating signal;
   a sensing element arranged to capacitively receive an input signal from said communication area in response to said communication signal, and
   a second activation element arranged to be capacitively coupled to said second conductive layer to lower a perturbation signal induced in said second conductive layer in response to said first alternating signal.

2. The device as defined in claim 1, wherein said second activation element is adapted to attenuate said perturbation signal.

3. The device as defined in claim 1, wherein said second activation element is connected to a grounding potential point.

4. The device as defined in claim 1, wherein said second activation element is arranged to receive a second alternating signal from a signal source and to capacitively induce a perturbation-reducing signal into said second conductive layer in response to said second alternating signal, wherein said second alternating signal has approximately the same frequency as said first alternating signal and wherein the phases of said first and second signals are out of phase with each other.

5. The device as defined in claim 4, wherein said second alternating signal is phase-shifted by a phase-shift comprised between 170 and 190 degrees as compared to the phase of said first alternating signal.

6. The device as defined in claim 1, wherein said device comprises a plurality of sets comprising a first activation element and a sensing element, wherein the sets are arranged to capacitively communicate with a plurality of communication areas spaced from each other.

7. The device as defined in claim 6, wherein said plurality of sets are arranged along a line.

8. The device as defined in claim 6, wherein said plurality of sets are arranged in the form of a matrix.

9. The device as defined in claim 1, wherein said communication area comprises a first and a second portion, wherein said communication signal is capacitively induced in said first portion and wherein said input signal received in said sensing element is capacitively induced from said second portion.

10. The device as defined in claim 9, wherein said first and second portions are in direct electrical contact with each other.

11. The device as defined in claim 9, wherein said first activation element has approximately the same shape and area as said first portion and wherein said sensing element has approximately the same shape and area as said second portion.

12. The device as defined in claim 9, wherein said communication area further comprises a third portion.

13. The device as defined in claim 12, wherein said portions are arranged along a line.

14. The device as defined in claim 12, wherein said portions are arranged in a matrix configuration.

15. The device as defined in claim 12, wherein at least two of said portions are in direct electrical contact.

16. The device as defined in claim 9, wherein said portions are arranged as a continuous element.

17. The device as defined in claim 1, wherein the area of said second conductive layer is at least five times larger than said communication area.

18. The device as defined in claim 1, wherein said communication area is made of one of the group comprised of polyaniline, polypyrrol, polyacetylene, polythiophene, printed carbon and printed metallic ink, and metals.

19. The device as defined in claim 1, further comprising a processor which is connected to said sensing element and which is arranged to determine said code with a comparator adapted to compare said input signal with a threshold value.

20. The device as defined in claim 19, wherein said processor is adapted to subtract the signal induced in the sensing element in response to the lowered or minimized perturbation signal of the second conductive layer from the input signal.

21. The device as defined in claim 1, wherein the area of said second activation element is at least two times larger than either one of said first activation element and said sensing element.

22. The device as defined in claim 1, further comprising an amplifier connected between said processor and said sensing element to amplify said input signal received by said sensing element.

23. The device as defined in claim 1, further comprising a frequency filter connected to said sensing element, wherein said frequency filter is adapted to select a frequency range of said input signal and to provide said frequency range to at least one of said processor and said amplifier.

24. The device as defined in claim 22, wherein said processor, said amplifier and said filter are arranged at a circuit board connected to said elements.

25. The device as defined in claim 1, wherein said first activation element and said sensing element are separated from each other by a material connected to ground.

26. The device as defined in claim 1, wherein said first and second layers are attached to each other.

27. The device as defined in claim 1, wherein said package is a paper-based material assembly.

28. The device as defined in claim 1, wherein said elements are made of one of the group comprised of conductive polymers such as polyaniline, polypyrrol, polyacetylene, polythiophene, and metals such as aluminium or copper.

29. The device as defined in claim 1, wherein said elements have a rectangular shape.

30. The device as defined in claim 1, wherein said elements are arranged in parallel with each other and preferentially arranged in a common plane.

31. The device as defined in claim 1, wherein the first activation element and the sensing element are used in combination with alignment areas arranged at the package for capacitively aligning the device with the code.

32. A method for capacitively minimizing at least one perturbation signal induced in at least one electrically conductive layer included in a package for a product when determining a code including at least one communication area arranged at the package, the at least one communication area including a first electrical conductivity and being arranged on or surrounded by an area having a different electrical conductivity, the method comprising:
arranging a first activation element in the vicinity of and spatially separated from the package;
arranging a sensing element in the vicinity of the package, wherein the sensing element is spatially separated from each of the package and the first activation element;
generating a first alternating signal in the first activation element;
capacitively inducing a communication signal into the at least one communication area in response to said generated first alternating signal;
capacitively receiving in the sensing element an input signal in response to said capacitively induced communication signal; and
arranging a second activation element in the vicinity of the package, wherein the second activation element is spatially separated from each of the package, the first activation element and the sensing element, such that the at least one perturbation signal induced in the at least one electrically conductive layer of the package in response to said generated first alternating signal is minimized capacitively.

33. The method as defined in claim 32, wherein said second activation element is connected to a grounding potential point such that said at least one perturbation signal induced in said at least one electrically conductive layer in response to said first alternating signal is capacitively decoupled.

34. The method as defined in claim 32, further comprising:
generating a second alternating signal into said second activation element, wherein said second alternating signal has approximately the same frequency as said first alternating signal and wherein the phases of said first and said second signals are out of phase with each other; and
capacitively inducing a perturbation-reducing signal into said at least one electrically conductive layer of said package in response to said second alternating signal such that said at least one perturbation signal induced in said at least one electrically conductive layer in response to said first alternating signal is attenuated by destructive interference.

35. The method as defined in claim 34, further comprising selecting the phase and the amplitude of said second alternating signal.

36. The method as defined in claim 34, wherein said second alternating signal is phase-shifted by a phase-shift comprised between 170 and 190 degrees as compared to the phase of said first alternating signal.

37. The method as defined in claim 32, further comprising processing said input signal for determining said code by comparing said input signal with a threshold value.

38. The method as defined in claim 37, wherein said processing further comprises subtracting a part of the input signal received in the sensing element, which part is induced in response to the minimized or attenuated perturbation signal of the electrically conductive layer, from said input signal.

39. The method as defined in claim 32, further comprising selecting a range of frequency for said input signal before said input signal is processed.

40. The method as defined in claim 32, further comprising amplifying said input signal after said input signal is received by said sensing element.

41. The method as defined in claim 32, wherein the area of said second activation element is two times larger than the area of either one of said first activation element and said sensing element.

42. The method as defined in claim 32, further comprising using the first activation element and the sensing element in combination with alignment areas arranged at the package for capacitive alignment of the device with the code.

43. The device as defined in claim 2, wherein said second activation element is connected to a grounding potential point.

44. The device as defined in claim 2, wherein said second activation element is arranged to receive a second alternating signal from a signal source and to capacitively induce a perturbation-reducing signal into said second conductive layer in response to said second alternating signal, wherein said second alternating signal has approximately the same frequency as said first alternating signal and wherein the phases of said first and second signals are out of phase with each other.

* * * * *